Aug. 15, 1950 W. SCHNEIDER 2,518,642
HAND-PROPELLED VEHICLE
Filed June 27, 1947 2 Sheets-Sheet 1
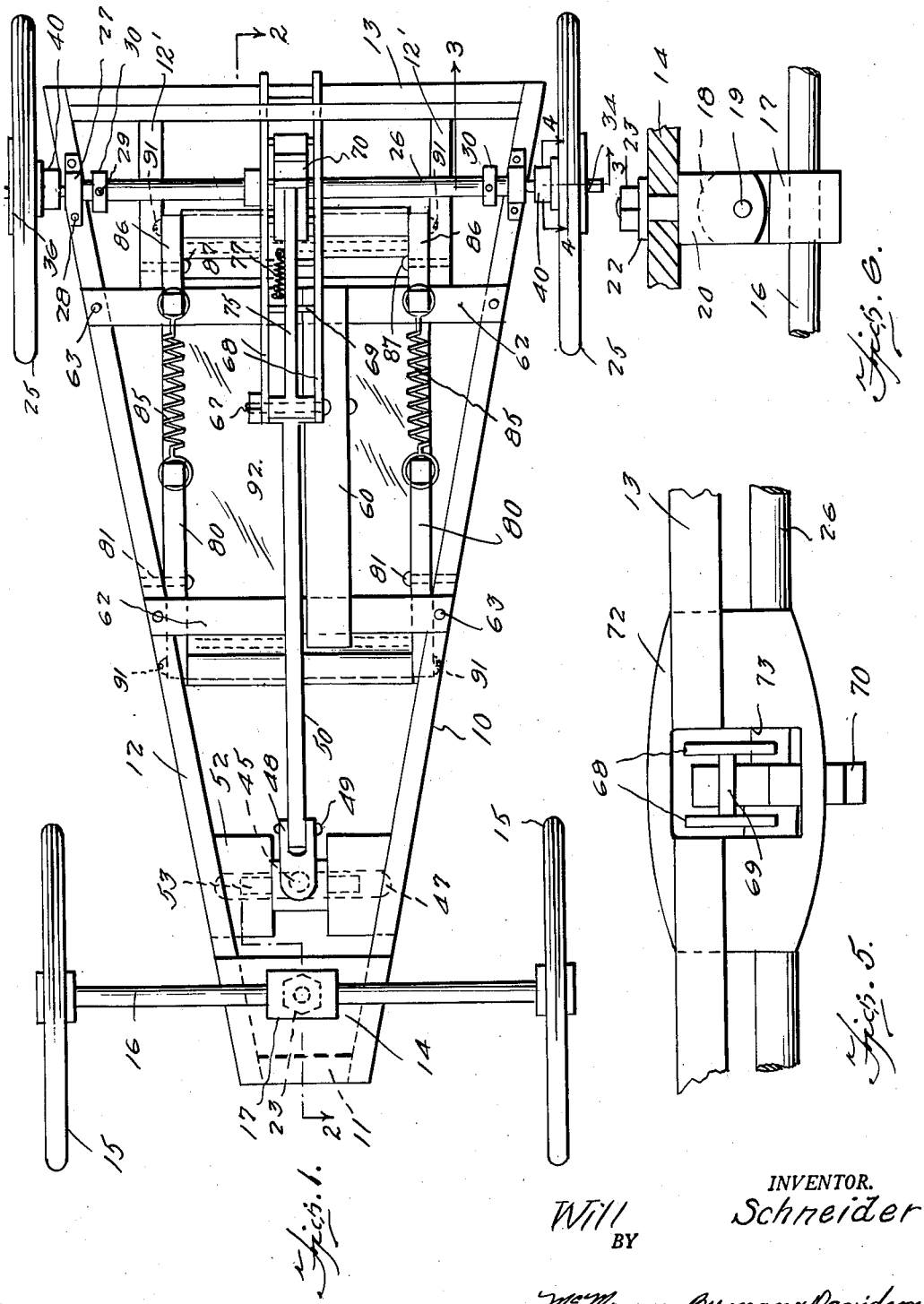
INVENTOR.
Will Schneider
BY
McMorrow, Berman & Davidson
ATTORNEYS Aug. 15, 1950
W. SCHNEIDER
2,518,642
HAND-PROPELLED VEHICLE
Filed June 27, 1947
2 Sheets-Sheet 2
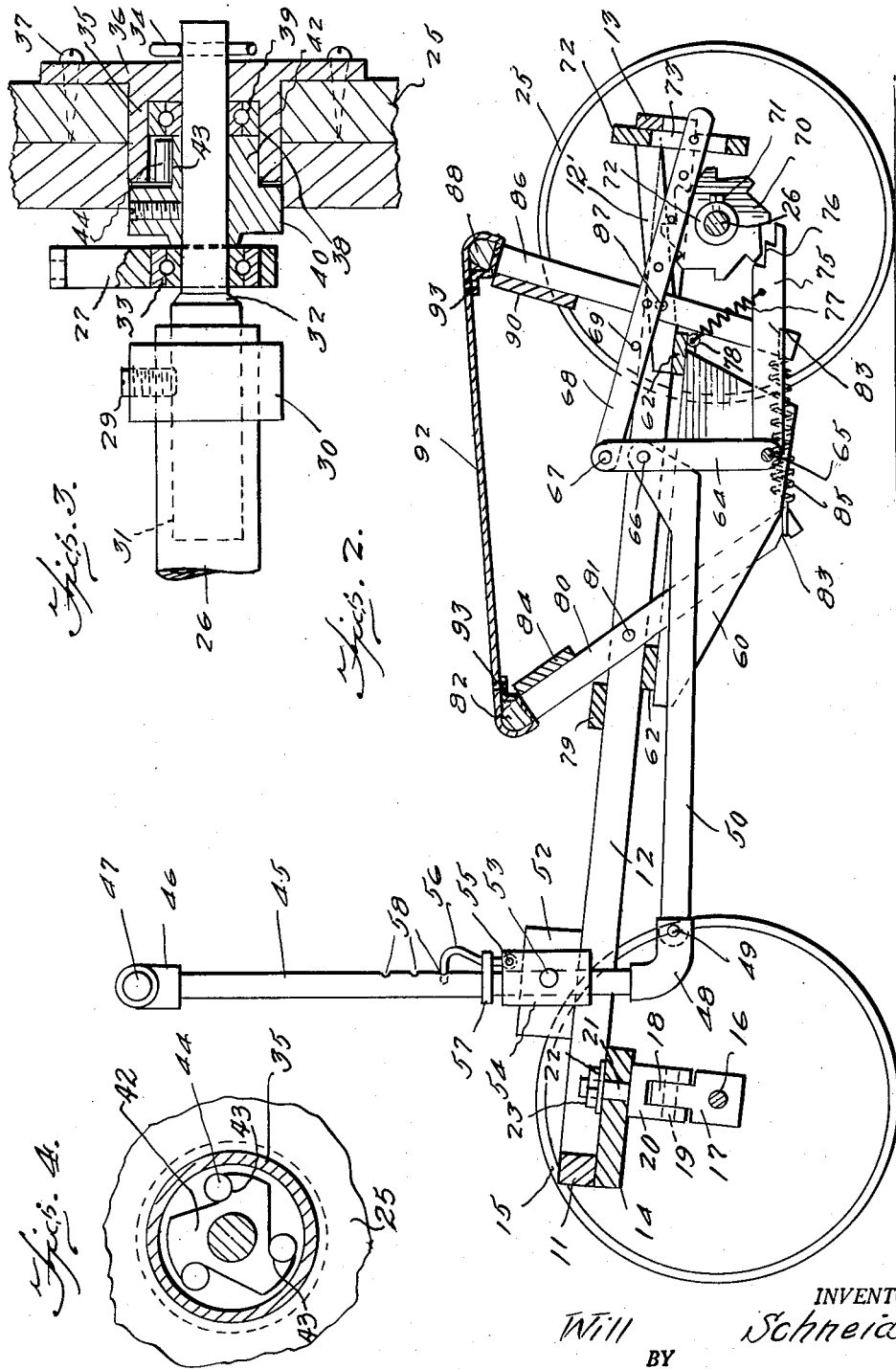
INVENTOR.
Will Schneider
BY
McMorrow, Berman + Davidson
ATTORNEYS Patented Aug. 15, 1950

2,518,642

UNITED STATES PATENT OFFICE 2,518,642

HAND-PROPELLED VEHICLE

Will Schneider, Cincinnati, Ohio

Application June 27, 1947, Serial No. 757,612

3 Claims. (Cl. 280—245)

This invention relates to a hand-propelled oscillating lever type vehicle.

The principal object of the present invention is to provide an improved form of transmission between the operating lever and the rear axle of a hand-propelled vehicle.

Another object of the present invention is to provide an improved form of transmission between the operating lever and the rear axle of the hand-propelled vehicle including an adjustable pivotal mounting for the operating lever.

An additional object of the present invention is to provide an improved form of transmission between the operating lever and the rear axle of a hand-propelled vehicle including a locking means for preventing reverse rotation of the drive axle and also back-roll of the vehicle.

A further object of the present invention is to provide a hand-propelled vehicle having an improved form of front wheel mounting which allows the front wheels to remain on the road when traveling over rough roads without imparting any undue strain to the frame.

A still further object of the present invention is to provide a novel form of resilient seat for use on a hand-propelled vehicle.

Still another object of the present invention is to provide a hand-propelled vehicle of the class described which can be economically manufactured from readily available material.

A further additional object of the present invention is to provide a hand-propelled vehicle of the class described having an improved transmission between the operating lever and the driving axle, thereby resulting in improved performances over known similar vehicles.

Additional objects, advantages, and improvements will become apparent from the following specification, taken in connection with the accompanying drawings, in which:

Figure 1 is an under plan view of the hand-propelled vehicle of the present invention;

Figure 2 is a vertical longitudinal sectional view taken on line 2—2 of Figure 1;

Figure 3 is a greatly enlarged fragmentary vertical section taken on line 3—3 of Figure 1;

Figure 4 is an enlarged fragmentary transverse vertical section taken on line 4—4 of Figure 1;

Figure 5 is a partial rear elevational view showing the guide for the ratchet bar;

Figure 6 is a detail view of the front axle mounting.

Referring now to the drawings in detail, and to Figure 1 in particular, this figure shows the frame as being comprised of side bars 10 and 12 and a front cross-bar 11 and a rear cross-bar 13, formed in truncated triangular relationship and connected together in any suitable manner, as by bolts or screws (not shown). Front wheels 15—15 are rotatably mounted on a front axle 16. At the mid-section of the front axle 16 an upwardly extending block 17 is mounted, this block having a reduced central section or tongue 18 which is rounded on its top and the surfaces of the block at the base of this tongue being likewise rounded. A complementary journal block 20 is mounted on the cross-plate 14 which is secured to the side bars 10 and 12 and the front bar 11 on the under side of the latter in any suitable means, as by bolts or screws (not shown). The journal block 20 is bifurcated and receives the tongue 18 on the journal block 17, a pin 19 passing through the bifurcated portions and the tongue 18, the base of the bifurcated section cooperating in bearing relationship with the rounded complementary top of the tongue 18. In the upper end of the journal block 20 there is mounted a stud bolt 21 which extends through a suitable hole in the cross-plate 14, a nut 23 and washer 22 being fitted on the upper end of the stud bolt.

Rear wheels 25—25 are mounted on an axle 26 which is journaled in suitable bearings on the side bars 10 and 12 of the frame by pillow blocks 27, the latter being fastened to the side bars by bolts or screws 28. It should be noted that the front wheels 15—15 and rear wheels 25—25 are the same diameter, but, nevertheless, the frame is inclined upwardly toward the front end due to the journal blocks 17—20 being interposed between the front axle 16 and the cross-plate 14 on the side bars 10 and 12. The rear axle 26 is preferably hollow and stub shafts 31—31 are mounted in either end of same. Collars 30 are positioned on the axle 26 and set screws 29 pass through these collars and the shell of the axle to secure the stub shafts 31 in place in the latter. Each stub shaft 31 is formed with a shoulder 32 just beyond the outer end of the axle 26. The pillow blocks 27 each mount ball bearings 33, the inner races of which abut the corresponding shoulder 32 on the stub shaft 31 and the flange 40 of a one-way clutch to be later described. Cotter keys 34 are fitted in diametral holes adjacent the outer ends of the stub shafts 31 to hold the wheels 25 thereon.

The rear wheels 25—25 have hubs 35 positioned centrally thereof, these hubs having counterbores 38 and flanges 36 secured to the wheels by screws 37. Within the counterbores 38 of each hub there is force fitted a ball bearing 39, and adjacent this bearing there is a hub 42 which is the driving member of a one-way clutch, this hub being integrally formed with a flange 40, which is secured to the stub shafts 31 by a radially positioned set screw 41. The hubs 42 are formed with arcuately spaced wedge or half-lobe shaped recesses 43 extending lengthwise thereof. Cylindrical rollers 44 are positioned in the recesses 43 and cooperate with the hubs 35, the latter forming the driven element of the one-way clutches.

The hand-propelling mechanism of the vehicle is comprised of a hand lever 45 and a transmission between same and the rear axle 26, which will now be described. The hand lever 45 may be a piece of ordinary pipe of suitable diameter. A T-connection 46 is fitted on the top of the lever 45 and arms 47 of suitable length are fitted into the T. At its bottom, the lever 45 has fitted thereon an elbow 48 which is split diametrically to receive one end of a connecting bar 50, pivotally secured thereto by a pin 49. The hand lever 45 passes between a pair of aligned blocks 52—52, which are secured to the side bars 10 and 12 of the frame in any suitable manner (not shown). A pivot block 54 freely surrounds the hand lever 45, this block being mounted for oscillation on a pair of aligned trunnions 53—53 journaled in the blocks 52—52. For vertically adjusting the position of the hand lever 45 in the pivot block 54, a detent 56 is provided which is pivoted in a slot (not shown) by a pin 55, which is constrained by a strap 57 fitted around the hand lever. The detent 56 cooperates with any one of a plurality of vertically spaced recesses 58 in the hand lever 45.

A vertically positioned plate 60 is mounted adjacent the center line of the frame and secured on the latter by cross-braces 62—62 in any suitable manner, as by bolts or screws (not shown), which cross-braces in turn are secured to the side bars 10 and 12 of the frame by bolts or screws 63. An oscillating link 64 is pivoted on the plate 60 at 65, and the connecting bar 50 is pivoted to this link adjacent the free end of the latter, at 66. A ratchet bar comprised of spaced parallel members 68—68 having longitudinally spaced pins 69 therebetween is pivoted to the free end of the oscillating link 64 at 67. A ratchet gear 70 is mounted on the axle 26, this gear having a hub 72 through which a radially positioned set screw 71 extends to secure the gear to the axle. The ratchet bars 68—68 straddle the ratchet gear 70, the pins 67 on the bar cooperating with the teeth on the gear. A plate 72 having an aperture 73 therein (Figure 5) is secured on the rear cross-frame bar 13, the ratchet bars 68—68 passing through the aperture 73. The plate 72 reinforces the rear cross-bar 13 and the aperture 73 therein allows for oscillation of the ratchet bars 68 with adequate clearance.

A back stop link or reverse rotation-preventing detent is comprised of a link 75 mounted on the pivot 65. The link 75 has its free end formed in notched construction at 76, the notches cooperating with the teeth of the ratchet gear 70, should the latter rotate in the clockwise direction (Figure 2). The link 75 is biased into engagement with the ratchet gear 70 by a coil tension spring 77 secured at one end to the link, and at the other end to one of the cross-bars 62 by an eyelet 78.

The seat for the operator of the vehicle is comprised of a pair of aligned front supports 80—80 pivoted to the side frame bars 10 and 12 by pins 81, and a pair of aligned rear supports 86—86, are pivoted to auxiliary frame bars 12' by pins 87. The auxiliary bars 12' are spaced inwardly of the side frame bars 10 and 12, Figure 1, and have their forward and rear ends rigidly secured to the transverse brace 62 and rear cross bar 13 respectively. The front supports 80—80 are connected by a top cross-bar 82 and a transversely disposed cross-plate 84. Similarly, the rear supports 86—86 are cross-connected by a top cross-bar 88 and a transversely disposed cross-plate 90, the bars being in each case connected to the supports by screws 91. Forward motion of the front supports 80—80 is limited by a cross-bar 79 secured to the side frame bars 10 and 12. A seat member in the form of a long piece of canvas 92, or other suitable material, is secured between the top bars 82 and 88 and held in position by being lapped around the corresponding bar adjacent each end and stitched back on itself at 93. The lower ends of the front and rear supports 80 and 86 are biased toward each other, and consequently the canvas seat 92 held in taut condition by coil tension springs 85 connected in notches 83 in the lower extensions of the front and rear supports 80 and 86, respectively.

The operation of the hand-propelled vehicle should be apparent from the above description. It may, however, be summarized as follows: The operator and passenger, usually a child, sit upon the canvas seat 92. Downward swing of the front supports 80—80 is limited by the cross-bar 79, Figure 2, and forward movement of the rear supports 86—86 by the tension springs 85—85. The vehicle is guided by the feet of a child operating on the front axle 16. The hand lever 45 may be shifted up or down through the pivot block 54 by adjusting the detent 56 so as to vary the arm between the power and the fulcrum according to the arm effort the child is capable of exerting. Such adjustment would also be made before starting extensive traveling up hill. As the hand lever 45 is pulled rearwardly, the connecting bar 50 is reciprocated forwardly and the link 64 is oscillated in a counter-clockwise direction (Figure 2). The ratchet bars 68—68 are carried forwardly by the link 64, and the pins 69 thereon pick up one or more of the teeth on the ratchet gear 70 and rotate the rear axle 26, such rotation being transmitted to the wheels 25—25 by the one-way clutches 42—42. On the forward stroke of the hand lever 45, the connecting bar 50 moves rearwardly and oscillates the link 64 in clockwise direction. Such oscillation of the link 64 imparts rearward movement to the ratchet bars 68—68, the pins 69 thereon running freely over the teeth of the ratchet gear 70. When the ratchet gear 70 is rotating in the counter-clockwise direction, that is, when the vehicle is being driven, the teeth of the ratchet gear run freely by the notches 76 on the back stop link 75. Should, however, the vehicle start to move backwards, as by getting out of control and running down hill, the rear axle 26 would rotate the ratchet gear 70 in a counter-clockwise direction, and the teeth of this gear would abut the notches on the back stop link 75, thereby arresting such backward movement of the vehicle. The overrunning or one-way clutches comprised of the hubs 42, wheel hubs 45 and rollers 44 provide for a forward drive of the wheels 25 by the axle 26. In addition, the one-way clutches allow the wheels 25—25 to rotate freely with respect to the axle 26 when the vehicle is running down hill, the axle in such case being stationary due to the hand lever 45 and the transmission not being operated. The one-way clutches also function to provide for the necessary greater angular velocity of the outer wheel 25 when the vehicle is traveling on a curve. At all times the pivot comprised of the journal blocks 17 and 20 keeps the front wheels 15—15 on the ground, even when the latter is rough and without imparting any undue stress on the frame.

It will be apparent that, while the above description and annexed drawings set forth the preferred embodiment of the present invention, various changes may be made in the sizes, shapes, proportions, and relative arrangement of the various parts without departing from the spirit of the invention as defined by the appended claims.

Having now described my invention, what I claim as new and useful and desire to secure by Letters Patent of the United States is:

1. In a hand propelled vehicle, a substantially horizontal frame, a rear axle mounted upon the frame, wheels on the rear axle, a depending member secured to the frame forwardly of the rear axle, a substantially vertical oscillating link pivotally connected near its lower end to the depending member, a longitudinal connecting bar pivotally connected at its rear end to the oscillating link and disposed beneath the frame, an upstanding hand lever pivoted to the frame near the forward end thereof and having its lower end pivotally connected with the connecting bar, a ratchet gear mounted upon the rear axle, a single longitudinally extending ratchet bar pivotally connected at its forward end to the top end of the oscillating link and engaging the top of the ratchet gear, a stop link connected to the frame and engaging the bottom of the ratchet wheel to lock the ratchet wheel against rotation opposite to the direction driven by the ratchet bar, and one-way clutch means between the rear axle and wheels.

2. In a hand propelled vehicle, a substantially horizontal frame, a rear axle mounted upon the frame, wheels mounted upon the rear axle, a ratchet gear mounted upon the rear axle near the transverse center of the frame, one-way clutches between the rear axle and wheels, a depending plate secured to the frame forwardly of the rear axle, a substantially vertical oscillating link pivotally connected near its lower end to the plate and having its top end disposed near the level of the frame, a longitudinal connecting bar pivotally connected at its rear end to the oscillating link near the upper end of such link, an upstanding hand lever pivoted to the frame near its forward end and extending below the frame and having its lower end pivotally connected to the forward end of the connecting bar, means secured to the frame to permit the vertical adjustment of the hand lever, and a single substantially horizontal longitudinal ratchet bar pivotally connected at its forward end to the top of the oscillating link and engaging the top of the ratchet gear to drive the same.

3. In a hand propelled vehicle, a substantially horizontal frame, said frame comprising forwardly converging sides, a member connecting the rear ends of the sides, a member connecting the forward ends of the sides, and front and rear transverse bars secured to the sides in intermediate positions, blocks secured to the sides near their forward ends, a center block pivotally connected between the blocks and having an opening, an upstanding hand lever disposed within the opening, means secured to the center block and engaging the hand lever to permit the same to be adjusted longitudinally, a depending plate secured to the transverse bars and disposed near the transverse center of the frame, a transverse pivot pin carried by the depending plate, an upstanding swingable link mounted upon the pivot pin, a longitudinally shiftable connecting member pivotally connected to the swingable link and hand lever, a rear axle secured to the frame, wheels mounted upon the rear axle, a ratchet gear mounted upon the rear axle, a bar pivotally connected to the top of the swingable link and extending rearwardly and over the ratchet gear and having elements to engage the ratchet gear teeth to drive the same, a stop link pivotally mounted upon the pivot pin and extending rearwardly thereof and beneath the ratchet gear, and a spring connecting the stop link and frame and serving to hold the stop link in engagement with the bottom of the ratchet gear to prevent backward rotation of the same.

WILL SCHNEIDER.

REFERENCES CITED

The following references are of record in the file of this patent:

UNITED STATES PATENTS

| Number | Name | Date |
|---|---|---|
| 422,087 | Loser | Feb. 25, 1890 |
| 917,910 | Thomas | Apr. 13, 1909 |
| 946,280 | Slotkin | Jan. 11, 1910 |
| 1,734,776 | Pallenberg | Nov. 5, 1929 |
| 2,156,590 | Humber | May 2, 1939 |
| 2,293,323 | Viall et al. | Aug. 18, 1942 |

FOREIGN PATENTS

| Number | Country | Date |
|---|---|---|
| 2,159 | Great Britain | 1886 |